(12) United States Patent
Hernandez et al.

(10) Patent No.: US 12,463,317 B2
(45) Date of Patent: Nov. 4, 2025

(54) RADIO COMMUNICATION ANTENNA CONSISTING OF A PREVIOUSLY BENT RIGID METALLIC WIRE, SUPPORT STRUCTURE AND CORRESPONDING PAYMENT TERMINAL

(71) Applicant: BANKS AND ACQUIRERS INTERNATIONAL HOLDING, Suresnes (FR)

(72) Inventors: Vincent Hernandez, Claveyson (FR); Régis Baptiste, Viarmes (FR)

(73) Assignee: BANKS AND ACQUIRERS INTERNATIONAL HOLDING, Suresnes (FR)

( * ) Notice: Subject to any disclaimer, the term of this patent is extended or adjusted under 35 U.S.C. 154(b) by 139 days.

(21) Appl. No.: 18/036,738

(22) PCT Filed: Nov. 12, 2021

(86) PCT No.: PCT/EP2021/081534
§ 371 (c)(1),
(2) Date: May 12, 2023

(87) PCT Pub. No.: WO2022/101415
PCT Pub. Date: May 19, 2022

(65) Prior Publication Data
US 2023/0411824 A1 Dec. 21, 2023

(30) Foreign Application Priority Data
Nov. 12, 2020 (FR) ........................... 2011615

(51) Int. Cl.
*H01Q 1/22* (2006.01)
*H01Q 1/12* (2006.01)

(52) U.S. Cl.
CPC ......... *H01Q 1/2216* (2013.01); *H01Q 1/1207* (2013.01)

(58) Field of Classification Search
CPC ............. G06Q 20/204; G06Q 20/3278; G06Q 20/352; G07F 7/0893; H01Q 1/1207; H01Q 1/2216; H01Q 7/00
See application file for complete search history.

(56) References Cited

U.S. PATENT DOCUMENTS

| 4,626,862 A | 12/1986 | Ma |
| 6,184,846 B1 * | 2/2001 | Myers ...................... H01Q 1/22 141/351 |

(Continued)

FOREIGN PATENT DOCUMENTS

| EP | 2873030 A1 | 5/2015 |
| FR | 0329689 A | 8/1903 |

OTHER PUBLICATIONS

Feb. 14, 2022 International Search Report issued in International Patent Application No. PCT/EP2021/081534.

(Continued)

*Primary Examiner* — Thien M Le
(74) *Attorney, Agent, or Firm* — Oliff PLC

(57) ABSTRACT

A system including a structural part of an internal architecture of an electronic terminal, constituted by a rigid material and a radio communications antenna. According to the invention, the system wherein the radio communications antenna is constituted by a previously bent rigid metal wire forming at least one turn around the structural part; and in that the internal structural part includes, on its periphery, means for gripping and guiding the rigid metal wire constituting the radio communications antenna.

9 Claims, 5 Drawing Sheets

(56) References Cited

U.S. PATENT DOCUMENTS

Figure 1:
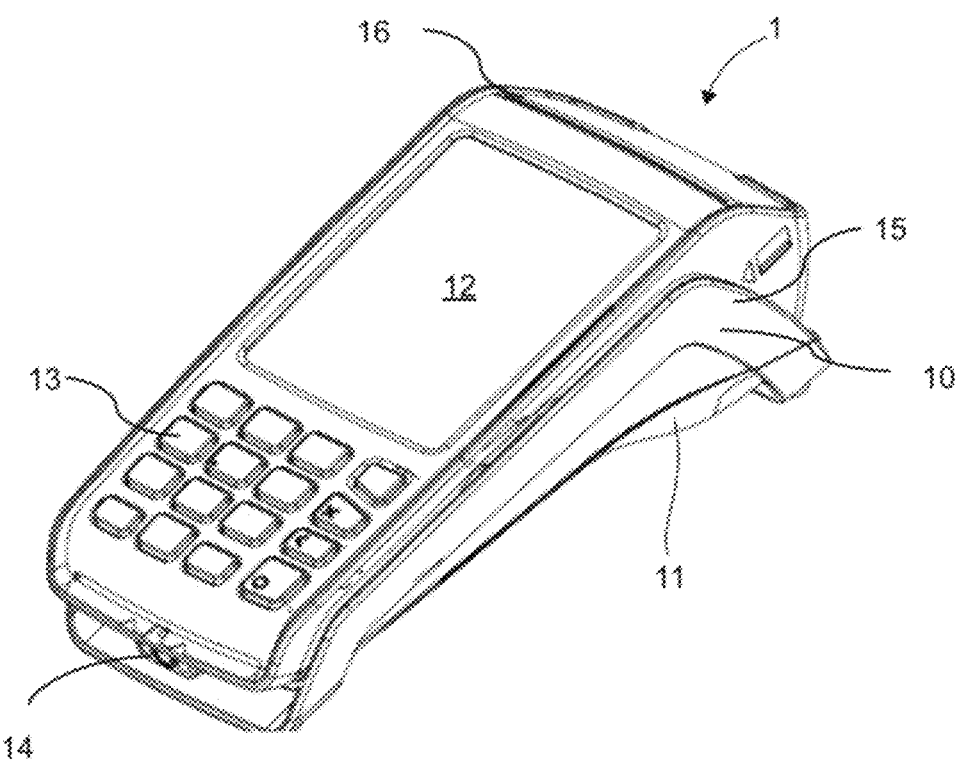

| | | | |
|---|---|---|---|
| 11,074,421 B1* | 7/2021 | Le Cam | G06K 7/10366 |
| 2005/0088347 A1* | 4/2005 | Vance | H01Q 5/371 |
| | | | 343/702 |
| 2006/0267853 A1 | 11/2006 | Naito | |
| 2015/0278792 A1* | 10/2015 | Naccache | G06Q 20/40 |
| | | | 705/18 |
| 2016/0164164 A1 | 6/2016 | Bonnet | |
| 2020/0073445 A1* | 3/2020 | Kuna | G06F 1/1656 |
| 2020/0321790 A1* | 10/2020 | Rubino | H02J 50/001 |
| 2021/0121066 A1* | 4/2021 | Rheineck | A61B 5/6803 |
| 2021/0201293 A1* | 7/2021 | Mossoba | G06Q 20/3223 |
| 2021/0341628 A1* | 11/2021 | Suzuki | G01S 19/14 |
| 2022/0404411 A1* | 12/2022 | Roy, Jr. | H02J 50/80 |

OTHER PUBLICATIONS

Feb. 14, 2022 Written Opinion issued in International Patent Application No. PCT/EP2021/081534.

\* cited by examiner

RADIO COMMUNICATION ANTENNA CONSISTING OF A PREVIOUSLY BENT RIGID METALLIC WIRE, SUPPORT STRUCTURE AND CORRESPONDING PAYMENT TERMINAL

FIELD OF THE INVENTION

The invention relates to the field of electronic terminals having wireless connection functions. More particularly, the invention finds application in terminals provided with a contactless, also called CLESS, connection interface. More particularly, the invention applies to the field of payment terminals which have contactless payment functions, using a payment means of the same type.

PRIOR ART AND ITS DRAWBACKS

With the acceleration of the development of so-called contactless payment means, such as contactless credit or payment cards, but also smartphones, the payment terminals produced in recent years incorporate contactless transaction processing devices. Such contactless transaction processing devices generally comprise a radio communication antenna, called a contactless antenna and a processor responsible for establishing and managing contactless communications. Such a processor can be a dedicated processor or a general purpose processor, depending on the case.

The processing of contactless payments is one of the latest functions added to payment terminals, among the numerous additional functions that have been successively added to terminals over the past few years. Among these complementary functions mention may in particular be made of wireless communication functions that comply with Wifi or Bluetooth technologies, communication functions via mobile telephone networks (GPRS, UMTS, LTE, etc.), improved input functions in particular by means of touch screens for example. These functions have been added with the evolution of technologies on the one hand and of the demands of users of these payment terminals on the other hand.

However, it happens that these numerous functions are in competition with each other. To mention only wireless communication techniques, although the frequency bands used by each of these techniques do not overlap, disturbances frequently occur between the different devices implementing these wireless communication techniques when they are activated simultaneously.

Thus, it is not uncommon for the contactless payment device to be disturbed either by inadvertent activation of a wireless communication device or even by the use of a touch screen or a keyboard of the payment terminal.

This problem stems from the fact that the payment terminal is light and compact. As a result, the different communication functions that are embedded in the payment terminal are located at very close distances from each other. Payment terminal designers are trying to find solutions allowing overcoming the problems encountered.

Thus, in the case of a contactless communication device, it is necessary to have a radio communication antenna which can transmit a signal to the contactless payment communication means and capture data that are emitted from these contactless payment means. Until now, such a radio communication antenna is generally placed around the screen of the payment terminal because, naturally, when a user wants to make a payment using contactless payment means such as a contactless payment card or a smartphone implementing a contactless payment functionality, he brings the same closer to the screen of the payment terminal.

In addition, the payment terminal designers have deemed that the radio communication antenna necessary for contactless payment, called the contactless antenna, should be placed in front of or close to the place where the user have his contactless payment means (that is to say close to the screen).

Finally, it must also be understood that the mounting of a payment terminal is a complex operation, carried out for the most part by hand, and that the payment terminal designers must take this aspect of things into account when they design a new payment terminal.

The patent application FR0329689 provides an answer to this problem which satisfies the various constraints set out above. Thus, in the proposed solution, the radio communication antenna consists of a flexible electric cable intended to be wound manually around an internal structural part of a payment terminal so as to form at least two turns around this internal structural part of a payment terminal. This allows reducing the production costs related to labor while guaranteeing correct coiling of the flexible electric cable. When such an internal structural part of a payment terminal is placed within the payment terminal, the periphery of the internal structural part, and consequently the radio communication antenna, is arranged sufficiently close to the external surface of the payment terminal that the quality of reception and emission of radio signals from the radio communication antenna is satisfactory.

However, despite the advances brought by this solution, the winding of the flexible electric cable constituting the radio communication antenna remains a delicate operation to carry out and the labor time associated with this operation remains significant when it is desired to ensure a satisfactory quality of winding. Moreover, the cable must be insulated, resulting in a more or less significant increase in diameter as well as additional mounting constraints due to this insulation.

Consequently, the results of this winding operation are difficult to repeat, leading, for the same range of payment terminals, to disparities in the performance of radio communication antennas and to additional calibration operations.

There is therefore a need to provide a solution which allows having a contactless antenna whose cost remains low, whose efficiency in terms of emission and reception allows offering the user a purchase experience which is satisfactory and which does not have all or part of the aforementioned drawbacks.

DISCLOSURE OF THE INVENTION

The present disclosure, of at least some embodiments, resolves all or part of the drawbacks of the prior art.

Thus, according to a first aspect, a system is disclosed comprising a part constituting a portion of an internal architecture of an electronic terminal, made of a rigid material and a radio communication antenna.

According to the present technique, such a system is remarkable in that:
  said radio communication antenna consists of a previously bent rigid metallic wire and forming at least one turn; and in that
  said part constituting a portion of an internal architecture of an electronic terminal comprises, means for gripping and guiding said rigid metallic wire constituting the radio communication antenna.

Such a radio communication antenna is preformed during its manufacture, which allows eliminating the operations of winding the rigid metallic wire around the periphery of the internal structural part.

The radio communication antenna is obtained by bending a rigid metallic wire according to a particular design adapted to a shape defined by the gripping and guiding means. Such a bending allows obtaining a winding that is both sufficiently rigid not to alter the quality of the radio communication antenna in emission and reception and at the same time sufficiently elastic to allow the insertion of the radio communication antenna thus preformed into the gripping and guiding means without deforming the bending and running the risk of altering the performance of the radio communication antenna.

The operation of mounting the radio communication antenna on the part constituting a portion of an internal architecture of an electronic terminal is thus facilitated. In addition, the elastic properties of the rigid metallic wire constituting the radio communication antenna allow the latter to remain in place once mounted on the part constituting a portion of an internal architecture of an electronic terminal.

Finally, such an industrial and automated winding of the rigid metallic wire according to a particular design is repeatable, contributing to the reduction of the manufacturing cost of radio communication antennas and guaranteeing a certain constancy in the performance of the latter.

In a first embodiment of the system, said part constituting a portion of an internal architecture of an electronic terminal is an internal structural part of said electronic terminal made of a rigid material and comprises, on its periphery, said means for gripping and guiding said rigid metallic wire constituting the radio communication antenna and in which said radio communication antenna forms at least one turn around said internal structural part.

The radio communication antenna is obtained by bending a rigid metallic wire according to a particular design adapted to the shape of the periphery of the internal structural part.

The operation of mounting the radio communication antenna on the internal structural part is thus facilitated. In addition, the elastic properties of the rigid metallic wire constituting the radio communication antenna allow the latter to remain in place once mounted on the internal structural part.

In a second embodiment of the system, said gripping and guiding means consist of fastening spacers arranged in slots formed in said part constituting a portion of an internal architecture of an electronic terminal.

Thus, for example, the part constituting a portion of an internal architecture of an electronic terminal can correspond to an electronic board arranged in the electronic terminal, such as the motherboard, Slots intended to receive and hold the fastening spacers are then formed directly on the motherboard.

In another example, the part constituting a portion of an internal architecture of an electronic terminal can correspond to the cover of the electronic terminal. Slots intended to receive and hold the fastening spacers are then formed directly in the cover body.

Of course, any other part constituting a portion of an internal architecture of an electronic terminal can receive the fastening spacers.

According to a feature of the system that is the object of the invention, said internal structural part further comprises, on its periphery, spacers ensuring a spacing between two turns of the rigid metallic wire constituting the radio communication antenna when said rigid metallic wire forms least two turns around said structural part.

Although the elastic properties of the rigid metallic wire constituting the radio communication antenna contribute to maintaining a spacing between the turns of the rigid metallic wire constituting the radio communication antenna, the presence of a fastening spacer allows guaranteeing such a spacing particularly in situations where the winding of the rigid metallic wire could have been deformed during operations of mounting the radio communication antenna on the internal structural part.

In a variant of the system which is the object of the invention, said rigid metallic wire constituting the radio communication antenna is covered with an electrically insulating coating.

According to another feature of the system which is the object of the invention, a value of a diameter of said rigid metallic wire constituting the radio communication antenna is comprised between 0.8 and 1.1 millimeters.

A rigid metallic wire with a diameter of 0.8 millimeters is for example a bare stainless steel conductive wire whereas a rigid metallic wire with a diameter of 1.1 millimeters is for example a stainless steel conductive wire sheathed with an insulating material. The values of the diameter of such a rigid metallic wire remain within a range of values allowing the production of a radio communication antenna intended to be mounted in a payment terminal.

The invention also concerns a payment terminal characterized in that it comprises a system in accordance with any one of the embodiments described above.

In a variant of the payment terminal, ends of said rigid metallic wire constituting the radio communication antenna are directly soldered to a motherboard of said payment terminal.

This is made possible thanks to the elastic properties of the rigid metallic wire constituting the radio communication antenna which allow the ends of the radio communication antenna to abut on the motherboard in order to be soldered thereto, making the presence of a connector unnecessary.

Another variant of the payment terminal concerns a payment terminal comprising two connectors, soldered to a motherboard of said payment terminal, within which two ends of said rigid metallic wire constituting the radio communication antenna are inserted.

Indeed, the presence of connectors may prove to be necessary or useful in some configurations and is quite compatible with such a radio communication antenna.

LIST OF FIGURES

Figure 2:
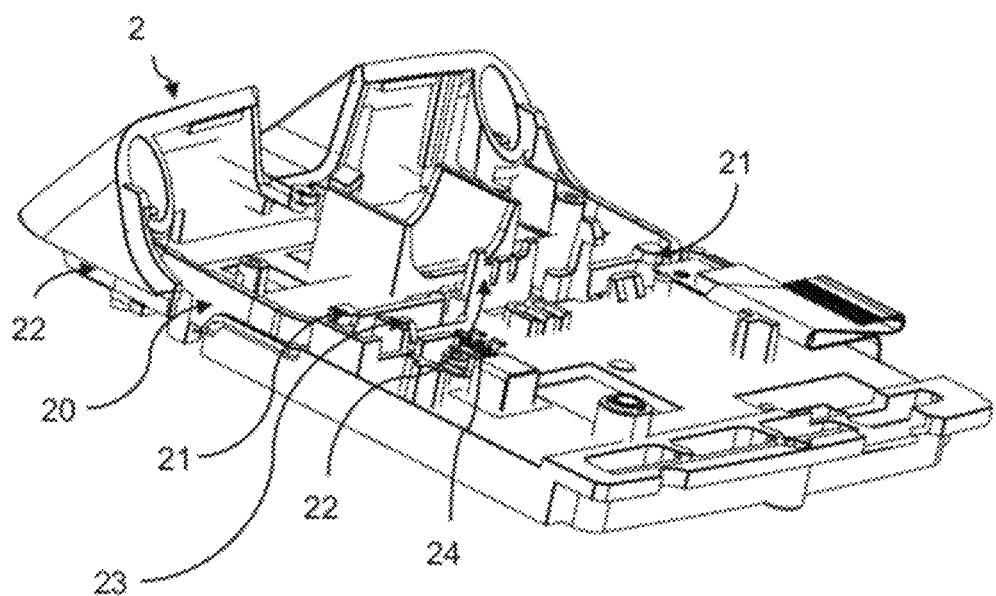
Figure 3:
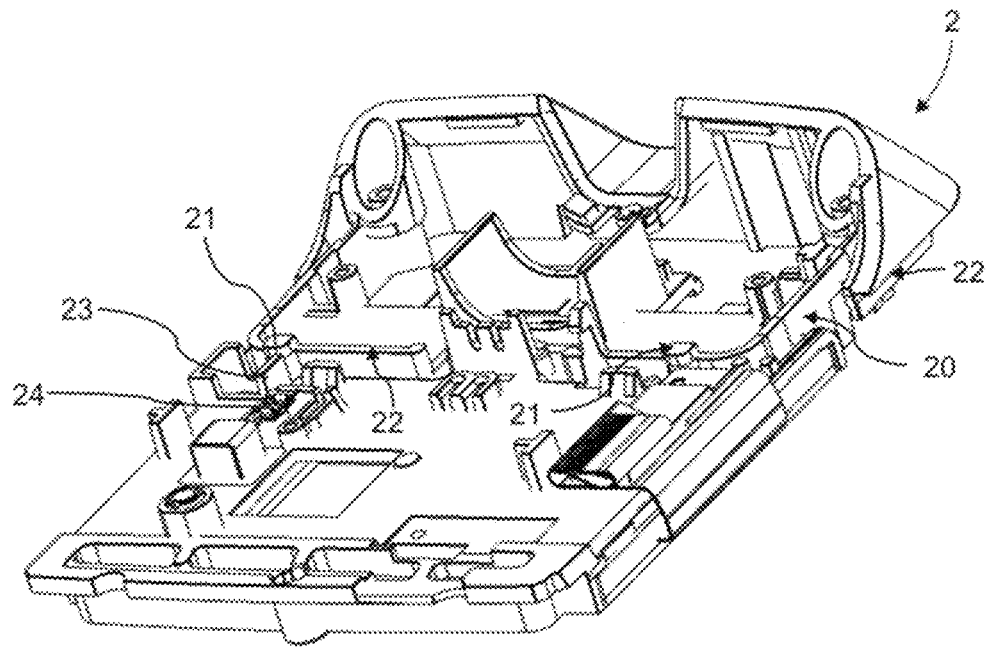
Figure 4:
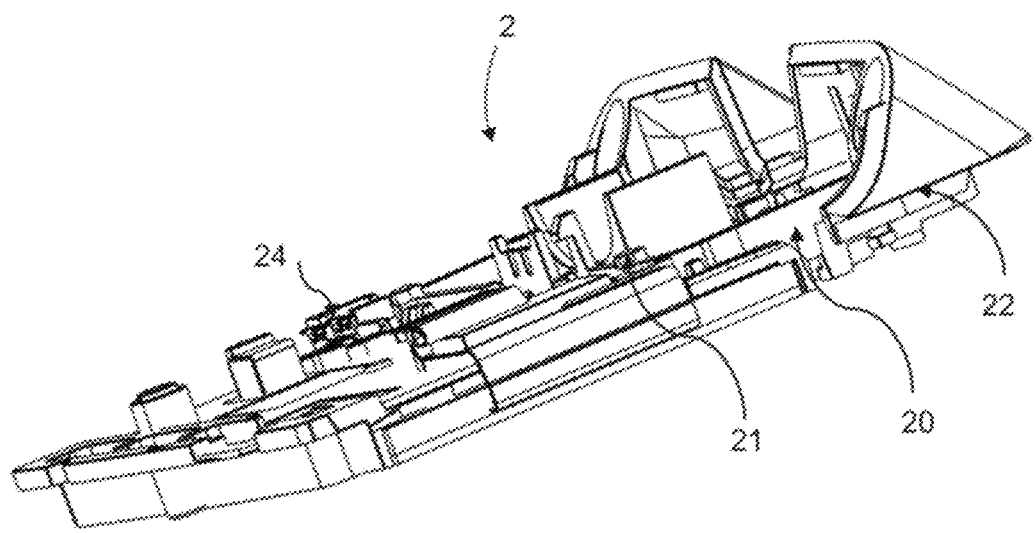
Figure 5:
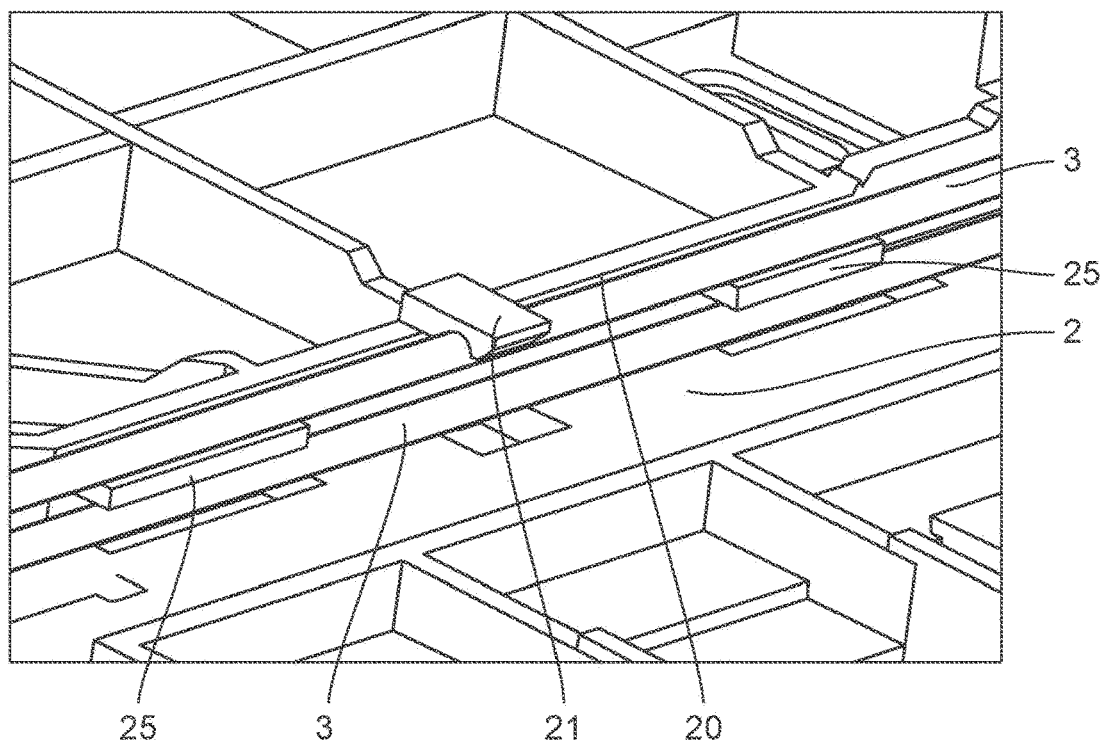
Figure 6:
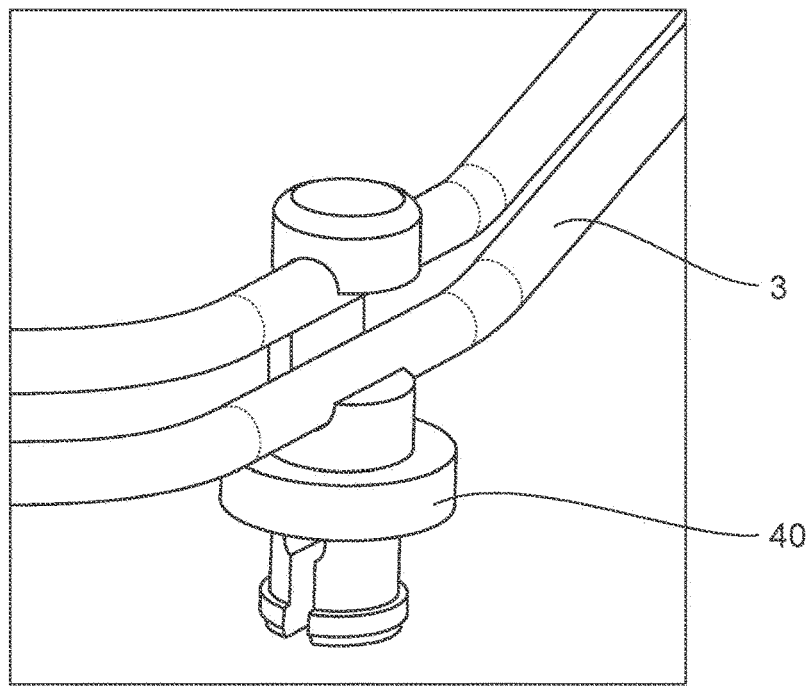
Figure 7:
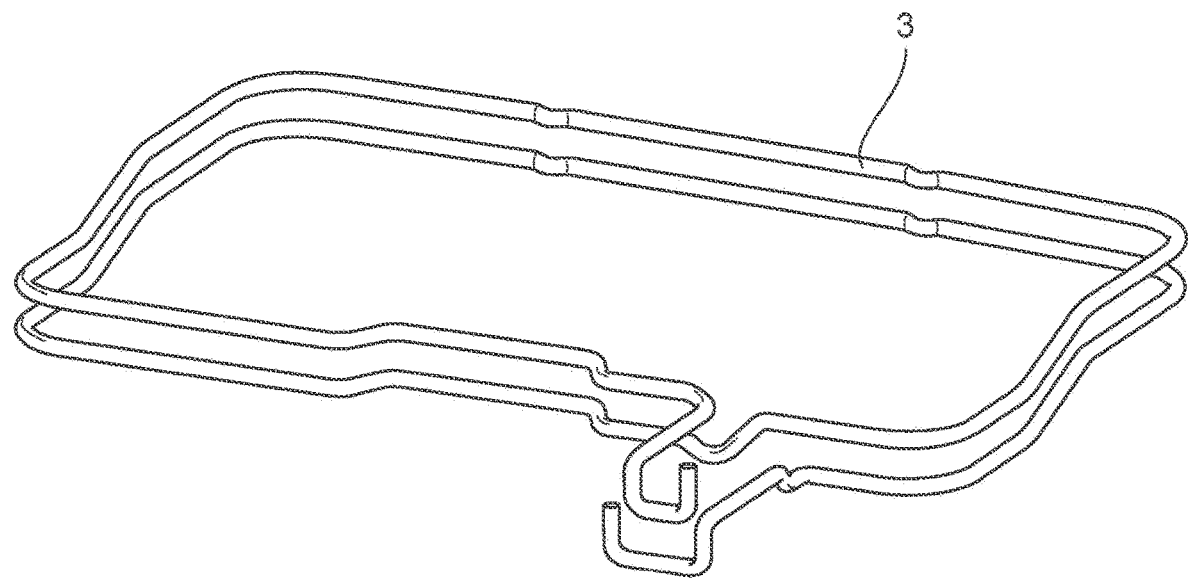
Figure 8:
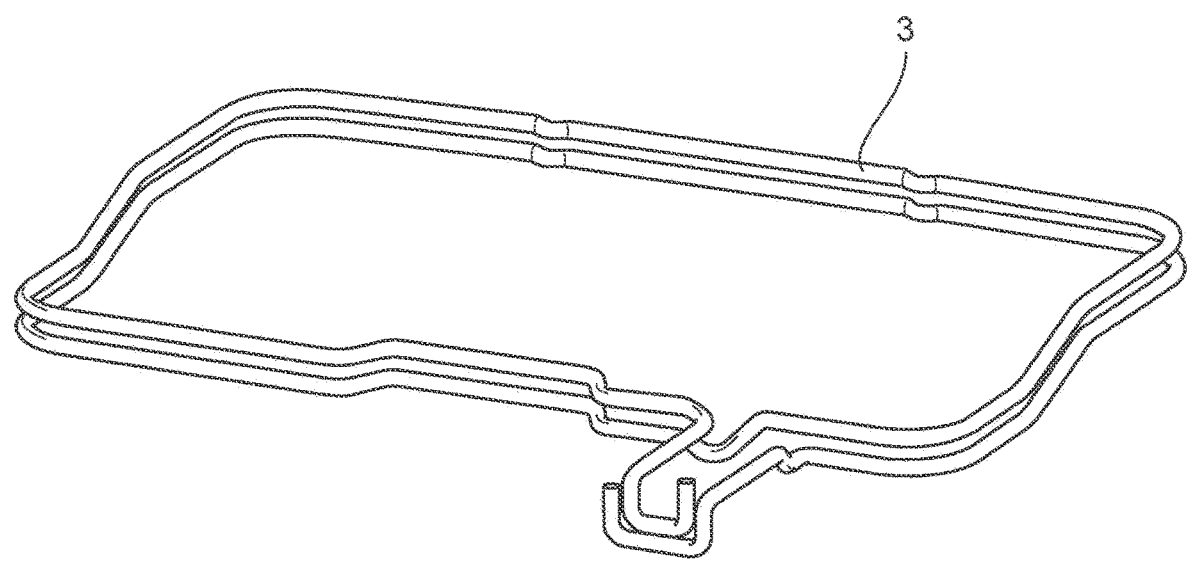
Figure 9:
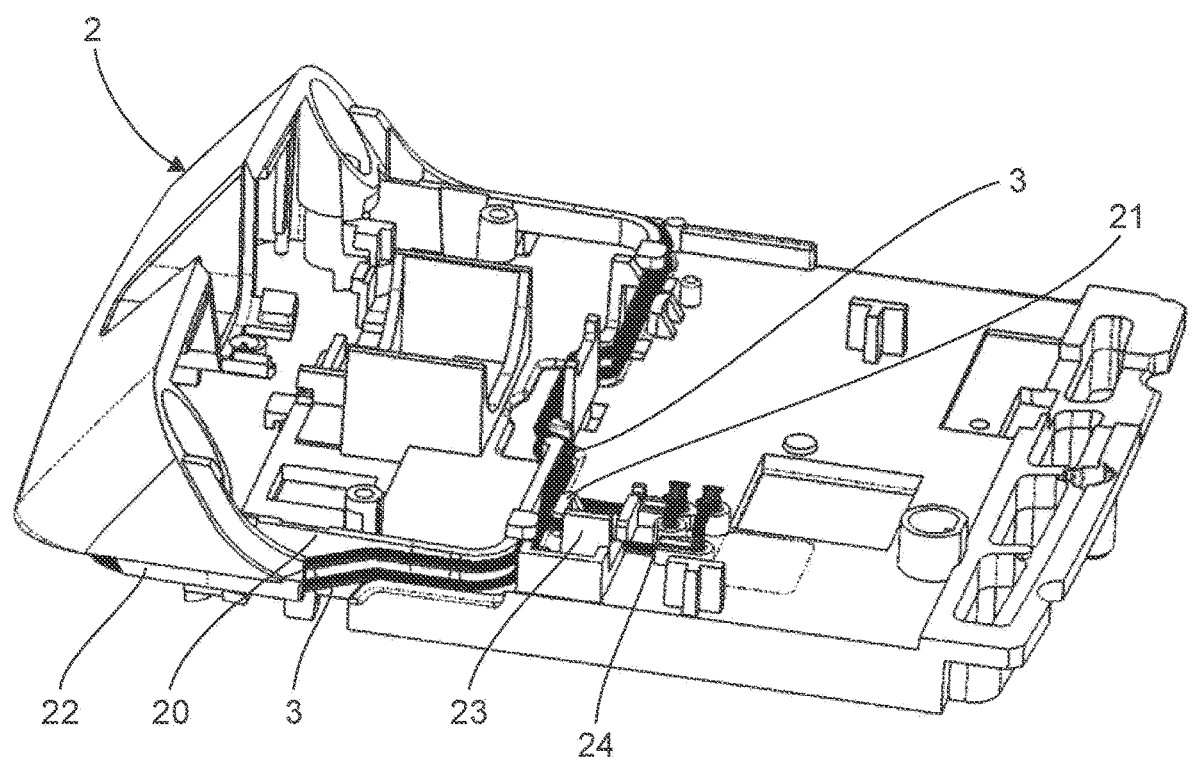

Other features and advantages of the proposed technique will appear more clearly on reading the following description of a preferred embodiment, given as a simple illustrative and non-limiting example, and the appended drawings, among which:

The [FIG. 1] illustrates a payment terminal:

The [FIG. 2] is a diagram of an internal structural part of a payment terminal according to the proposed technique;

The [FIG. 3] represents a first embodiment of the internal structural part of a payment terminal;

The [FIG. 4] represents a second embodiment of the internal structural part of a payment terminal;

The [FIG. 5] represents spacers arranged on the internal structural part;

The [FIG. 6] represents fastening spacers ensuring the holding and guiding of the contactless antenna:

The [FIG. 7] represents a first embodiment of a contactless antenna intended to be introduced into a payment terminal;

The [FIG. 8] represents a second embodiment of a contactless antenna intended to be introduced into a payment terminal;

The [FIG. 9] represents the contactless antenna mounted on the internal structural part.

DETAILED DESCRIPTION OF EMBODIMENTS OF THE INVENTION

1. Summary

The multitude of functions incorporated in a modern payment terminal obliges terminal designers to find solutions to ensure that its functions can be implemented in the most satisfactory way possible. Among these functions, the contactless payment function cause both operational and economic problems.

The problem underlying the proposed technique will be better understood on reading [FIG. 1]. A modern payment terminal 1 comprises an upper half-shell 10 and a lower half-shell 11. At an upper face of the payment terminal 1, a number of elements are located at the openings of the upper half-shell 10: the payment terminal thus comprises a screen 12, a keyboard 13 used to perform the operations necessary for the validation of a payment, a first memory card reader 14 such as for example a chip card reader, a second memory card reader 15 such as for example a magnetic card reader often positioned laterally, a printer 16 used to print for example purchase receipts. In general, the chip card reader 14 is positioned under the keyboard 13 on the front face of the payment terminal 1. The printer 16 is in turn positioned beyond the screen 12, on the rear face of the payment terminal 1. The front face of the payment terminal 1 often comprises a hatch (not shown in the figure) for accessing a slot allowing the insertion of a third memory card. This third memory card can for example be a card intended for a professional.

To perform the mounting of this payment terminal 1, it is first of all necessary to integrate a number of components on electronic boards. Then, when all the components have been integrated, the different plastic parts that constitute the payment terminal 1 are assembled. The assembly of the lower half-shell 11 and the upper half-shell 10 constitutes the final phase of the assembly of the payment terminal 10. This lower half-shell 11 and this upper half-shell 10 are generally screwed onto an internal structural part of the payment terminal. This internal structural part of the payment terminal 1, generally made of plastic, can be assimilated to a skeleton of the payment terminal 1. This internal structural part is itself composed of several plastic parts which are assembled together.

As previously explained, the mounting of a payment terminal 1 is an operation which comprises numerous phases during which human intervention is required in particular in order to manually wind the flexible electric cable on the periphery of the internal structural part so as to form several turns around it and thus create a contactless antenna. However, the winding of the flexible electric cable constituting the radio communication antenna remains a delicate operation to carry out and the labor time associated with this operation remains significant when it is desired to ensure a satisfactory quality of winding. Consequently, the results of this winding operation are difficult to repeat, leading, for the same range of payment terminals, to disparities in the performance of the radio communication antennas.

From then on, the inventors of the present solution had the idea of designing, firstly, a radio communication antenna, or contactless antenna, consisting of a previously bent rigid metallic wire according to a particular design. Advantageously, the manufacturing cost of such a contactless antenna remains low, and this emission and reception performance complies with the requirements for the processing of so-called contactless transactions.

Secondly, the inventors of the present solution propose a part constituting a portion of an internal architecture of an electronic terminal, made of a rigid material and provided with gripping and guiding means adapted to facilitate the mounting of the contactless antenna and ensure the proper operation of the latter once the payment terminal 1 is completely mounted. The particular design of the bending of the rigid metallic wire is adapted to a shape defined by the gripping and guiding means.

The use of a previously bent rigid metallic wire according to a particular design allows obtaining a winding that is both sufficiently rigid not to alter the quality of the contactless antenna in emission and reception, and at the same time sufficiently elastic to allow the insertion of the contactless antenna thus preformed into the gripping and guiding means without deforming the bending and thus running the risk of altering the performance of the contactless antenna.

Similarly, as the volume available in a payment terminal 1 is relatively limited, the inventors had the idea of using a particular internal structural part on which to mount the contactless antenna.

Of course, the presented embodiments only represent possibilities for implementing the present technique and should not be considered as limiting with regards to the scope of the proposed technique, in particular in its application to terminals other than the payment terminals, and in particular communication terminals.

1. Description of an Embodiment of the Structural Part

In this embodiment, said part constituting a portion of an internal architecture of an electronic terminal is an internal structural part of said electronic terminal.

[FIG. 2] represents such an internal structural part 2. This internal structural part 2 is made of a rigid material such as for example a plastic.

This internal structural part 2 can be of any general shape such as for example a planar shape. Of course, other shapes are possible for this internal structural part 2.

According to the specifications of the contactless standard, this internal structural part 2 is sufficiently large that the general surface occupied by the contactless antenna meets these standards. Furthermore, the periphery 20 of the internal structural part 2, and consequently the periphery of the contactless antenna, is, when the payment terminal 1 is mounted, sufficiently close to the external surface of the payment terminal so that the quality of emission and reception of the contactless antenna is of good quality.

Such an internal structural part 2 comprises on its periphery 20 a plurality of gripping means 21 and a plurality of guiding means 22 of the contactless antenna.

Furthermore, this internal structural part 2 comprises an outlet duct 23 in order to guide the ends of the rigid metallic wire constituting the contactless antenna towards means 24 for holding these ends of the rigid metallic wire constituting the contactless antenna. These holding means 24, such as connection connectors for example, are used to hold the contactless antenna in place once the latter is mounted on the internal structural part 2 and to guide the ends of the rigid metallic wire towards the motherboard. Once the contactless antenna is placed on the internal structural part 2, the internal structural part 2 can be used to continue the mounting the payment terminal 1.

The two ends of the antenna can then be connected to the motherboard of the payment terminal 1, according to a third aspect of the described technique, which will be developed later.

Furthermore, the means for gripping 21 and guiding 22 the contactless antenna further have means for maintaining the winding of the contactless antenna tensioned. Depending on the embodiments, these tensioning means are for example in the form of a curvature in the path of the rigid metallic wire constituting the contactless antenna or even retaining clips.

In the embodiment described below, the internal structural part 2 is arranged close to the printing roll of the payment terminal 1. This allows moving the antenna as far away as possible from the areas likely to produce interference. For this embodiment, the inventors thus had the idea of using an antenna support which is one of the parts necessary for mounting the terminal on the printer.

This embodiment of the internal structural part 2 as previously described is presented in relation to FIGS. 3 and 4. The reference numerals of [FIG. 2] have been retained. In this embodiment, the inventors have chosen to integrate the contactless antenna beyond the area of the screen 12 of the payment terminal, in order to overcome constraints due to the presence of any metallic portions of the screen 12, the motherboard and the other antennas in particular the antenna used for communications according to mobile telephony techniques. As a result, the contactless antenna is located around the paper roll of the printer 16 because this part does not disturb the emission or reception of radio signals by the contactless antenna.

Thus, the internal structural part 2, in this embodiment, is a part serving as a support, at least partially, for a paper roll. The means for gripping 21 and guiding 22 the contactless antenna are materialized in the form of a channel whose width is not constant, as can be seen in FIGS. 3 and 4. This channel is nevertheless shaped to receive the contactless antenna. This absence of constancy in the width of the channel allows holding the contactless antenna on the internal structural part 2. Thus, the locations where the channel is widest correspond to the portions of the contactless antenna where the different turns of the contactless antenna are parallel. However, the locations where the channel is narrowest correspond to portions of the contactless antenna where the turns are superimposed in order to adapt to the ergonomics of the internal structural part 2.

In this embodiment moreover, the internal structural part 2 allows ensuring that the contactless antenna is arranged close to the external surface of the payment terminal 1 in order to promote the emission and reception range of the contactless antenna which, according to the standard, must be 0 to 4 cm.

The internal structural part 2 is inscribed in a rectangular parallelepiped. This internal structural part 2 is composed for example of acrylonitrile butadiene styrene or a mixture of polycarbonates and acrylonitrile butadiene styrene. These materials provide the necessary rigidity for such internal structure parts 2, and are thus preferred for this implementation.

This is a part that can be made using a molding technique. The polyamide and fiberglass mixture allows obtaining a part of great rigidity. This is important for two reasons in this embodiment: the rigidity of this internal structural part 2 contributes to the general rigidity of the payment terminal.

The internal structural part 2 may also comprise on its periphery 20, fastening spacers 25 shown in [FIG. 5].

In a particular implementation, the rigid metallic wire constituting the contactless antenna 3 only constitutes a single turn. In order to constitute the contactless antenna 3, additional turns can be made by means of the same rigid metallic wire but around another part constituting a portion of an internal architecture of an electronic terminal separate from the internal structural part 2.

1. Description of an Embodiment Using Fastening Spacers

In this embodiment, said part constituting a portion of an internal architecture of an electronic terminal is for example an electronic card arranged in the electronic terminal, such as the motherboard, or even the cover of the electronic terminal.

Such fastening spacers 40 are shown in [FIG. 6]. Such fastening spacers 40 are arranged in slots formed in said part constituting a portion of an internal architecture of an electronic terminal and ensure the holding and guiding of the contactless antenna. When the contactless antenna comprises more than one turn, the fastening spacers 40 also allow maintaining a minimum spacing between the turns of the rigid metallic wire constituting the contactless antenna.

In a particular implementation, the rigid metallic wire constituting the contactless antenna 3 only constitutes a single turn. In order to constitute the contactless antenna 3, additional turns can be made by means of the same rigid metallic wire but around another part constituting a portion of an internal architecture of an electronic terminal.

1. Description of an Embodiment of a Preformed Contactless Antenna

This embodiment of the contactless antenna 3 as previously described is presented in relation to FIGS. 7 and 8.

[FIG. 7] shows a contactless antenna 3 in relaxed mode, that is to say as it appears when leaving the factory before it is mounted on the internal structural part 2.

As previously explained, such a contactless antenna 3 is preformed during its manufacture, which allows eliminating the operations of winding the rigid metallic wire around the periphery of the internal structural part 2.

Thus, the contactless antenna 3 is obtained by bending a rigid metallic wire according to a particular design adapted to the shape of the periphery 20 of the internal structural part 2. Such a bending allows obtaining a winding that is both sufficiently rigid to guarantee the maintenance of its geometry and not to alter the emission and reception performance of the contactless antenna 3 and at the same time sufficiently elastic to allow the insertion of the contactless antenna 3 thus preformed into the gripping 21, and guiding 22 means arranged on the periphery 20 of the internal structural part 2 without deforming the bending and running the risk of modifying the geometry of the contactless antenna 3 and altering its performance.

The rigid metallic wire constituting the contactless antenna 3 is for example a rigid metallic wire with a diameter of 0.8 millimeters such as a bare conductive wire, for example made of stainless steel. The rigid metallic wire can also be a conductive wire sheathed by an insulating material with a diameter of 1.1 millimeters. The values of the diameter of such a rigid metallic wire remain within a range of values allowing the production of a contactless antenna intended to be mounted in a payment terminal.

Such a contactless antenna is obtained by means of a machine tool capable of shaping a metallic profile according to a particular design. Once the particular shaping is obtained, the machine tool cuts the contactless antenna 3. Thus, the contactless antenna manufacturing process is a repeatable industrial process contributing to the reduction of the manufacturing cost of contactless antennas and guaranteeing a certain constancy in the performance of the latter.

[FIG. 8] represents a contactless antenna 3 in compressed mode, that is to say as it appears when it is mounted on the internal structural part 2.

[FIG. 9] represents the contactless antenna 3 mounted on the internal structural part 20. The contactless antenna 3 is arranged on the periphery 20 of the internal structural part 3 from the lower face of the internal structural part 2. Thus, the contactless antenna 3 slides along the periphery 20 until it abuts on the gripping means 21. Once in place, the contactless antenna is held in position thanks to the elastic properties of the rigid metallic wire which constitutes it.

In an embodiment of the invention, the two ends of the rigid metallic wire constituting the contactless antenna are in the form of a spring which come to rest directly on the motherboard of the payment terminal. In this embodiment, the presence of connectors is not necessary since the elastic properties of the bent rigid metallic wire constituting the contactless antenna 3 allow the two ends of the rigid metallic wire to abut on two determined locations of the motherboard, such as contact pads or reception orifices. The ends of the rigid metallic wire can then, if necessary, be soldered to the motherboard. When the ends of the rigid metallic wire are not soldered to the motherboard, the contactless antenna 3 is removable, which can facilitate the maintenance operations of the terminal, and therefore reduce the maintenance costs.

The connection with the motherboard can also be ensured by the contact force between the ends of the rigid metallic wire and a conductive pad formed on the motherboard.

In another embodiment, the two ends of the rigid metallic wire constituting the contactless antenna 3 are introduced into two connectors mounted on the motherboard of the payment terminal 1. These connectors allow ensuring electrical contact between the contactless antenna 3 and the motherboard as well as the good mechanical strength of the rigid metallic wire constituting the contactless antenna 3 via a conventional soldering process.

Finally, the general solution of the present technique proposes a contactless antenna obtained by a repeatable industrial process contributing to the reduction of the manufacturing cost of the contactless antennas and guaranteeing constancy in the performance of the latter.

The invention claimed is:

1. A system comprising a part constituting a portion of an internal architecture of an electronic terminal, made of a rigid material, the system also comprising a radio communication antenna, the system wherein:
    the radio communication antenna consists of a previously bent rigid metal wire that is continuously looped; and in that
    the part constituting a portion of an internal architecture of an electronic terminal is an internal structural part of the electronic terminal made of a rigid material comprising, on its periphery, means for gripping and guiding the rigid metallic wire constituting the radio communication antenna and in which the radio communication antenna forms at least one turn around the internal structural part.

2. The system according to claim 1, wherein the gripping and guiding means consist of fastening spacers arranged in slots formed in the part constituting a portion of an internal architecture of an electronic terminal.

3. The system according to claim 2, wherein the internal structural part further comprises, on its periphery, spacers ensuring a spacing between two turns of the rigid metallic wire constituting the radio communication antenna when the rigid metallic wire forms at least two turns around the structural part.

4. The system according to claim 1, wherein the rigid metallic wire constituting the radio communication antenna is covered with an electrically insulating coating.

5. The system according to claim 1, wherein a value of a diameter of the rigid metallic wire constituting the radio communication antenna is comprised between 0.8 and 1.1 millimeters.

6. The system according to claim 1, wherein the structural part further comprises an outlet duct of the rigid metallic wire constituting the radio communication antenna.

7. An electronic terminal wherein it comprises a system according to claim 1.

8. The electronic terminal according to claim 7, wherein ends of the rigid metallic wire constituting the radio communication antenna are directly soldered to a motherboard of a payment terminal.

9. The electronic terminal according to claim 8, wherein it comprises two connectors, soldered to a motherboard of the payment terminal, within which two ends of the rigid metallic wire constituting the radio communication antenna are inserted.

* * * * *